United States Patent [19]
Stanford

[11] Patent Number: 5,675,480
[45] Date of Patent: Oct. 7, 1997

[54] MICROPROCESSOR CONTROL OF PARALLEL POWER SUPPLY SYSTEMS

[75] Inventor: Edward R. Stanford, Spring, Tex.

[73] Assignee: Compaq Computer Corporation, Houston, Tex.

[21] Appl. No.: 654,863

[22] Filed: May 29, 1996

[51] Int. Cl.[6] ................................................. H05B 6/08
[52] U.S. Cl. ....................................................... 363/21
[58] Field of Search ........................... 363/35–37, 40–41, 363/20–22; 307/66, 83

[56] References Cited

U.S. PATENT DOCUMENTS 4,499,531  2/1985  Bray ................................ 363/19
4,860,185  8/1989  Brewer et al. ................... 363/41
5,010,223  4/1991  Icim .............................. 219/10.77

Primary Examiner—Adity Krishnan
Attorney, Agent, or Firm—Fish & Richardson P.C.

[57] ABSTRACT

This invention relates to a power supply module that includes an input and an output, a power converter for supplying power from the input to the output, a controller for controlling the amount of power supplied from the input to the output in response to a feedback circuit, a module current sensing circuit for sensing module output current at the output, and a microprocessor for selectively adjusting voltage in the feedback circuit in response to the module output current sensed by the module current sensing circuit.

19 Claims, 10 Drawing Sheets

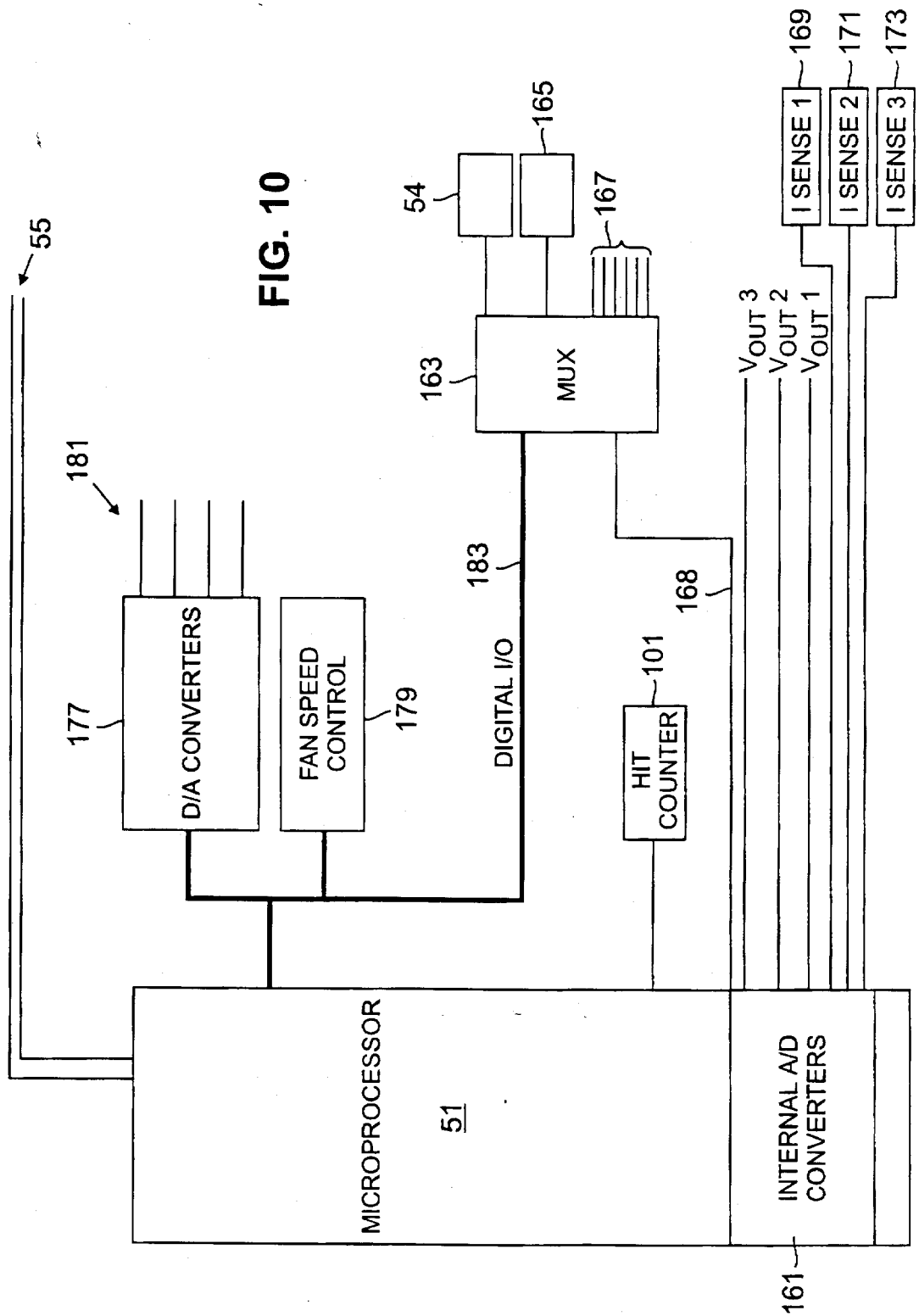

MICROPROCESSOR CONTROL OF PARALLEL POWER SUPPLY SYSTEMS

FIELD OF THE INVENTION

The invention relates to parallel power supply systems comprising multiple power supply modules.

BACKGROUND OF THE INVENTION

Parallel power supply systems are used when the desired output current exceeds a level that can be produced by a single power supply. Because currents add in parallel, there is theoretically no limit to the amount of current that can be supplied by a parallel power supply system, so long as additional modules are added. Typically, parallel power supply systems are designed such that the system has one more power supply than is theoretically necessary to deliver the desired output current. Parallel power supply systems conforming with this design criterion are termed "N+1 redundant".

A conventional N+1 redundant parallel power supply system is illustrated in FIG. 1. This system 11 includes a plurality of identical power supply modules 13. Power supply modules 1, 2, 3, and N+1 are shown in the figure. The output capacities of the power supply modules 13 and the number of power supply modules are chosen such that the sum of the current outputs of the N+1 power supplies at maximum capacity exceeds the desired load current $i_{LOAD}$ by at least the output capacity of one power supply module. In theory, this ensures none of the power supply modules 13 are driven at maximum output capacity, and also provides redundancy in the event of failure of one of the modules. As shown in the figure, the respective output currents $i_1$, $i_2$, $i_3$, and $i_{N+1}$ of the power supply modules 13 are added to form a system output current $i_{TOTAL}$ that is supplied to load 15. A return path is provided to return the current $i_{RETURN}$ to the respective power supply modules 13.

Certain practical considerations make current sharing between power supply modules in a parallel power supply system difficult to achieve. Although the power supply modules 13 are chosen to be identical, due to differences in component tolerance the output impedance of each power supply module will vary slightly. When there is even a very small difference in output impedance between the modules, the module with the highest output voltage and lowest impedance will try to supply all of the load current $i_{LOAD}$ until it reaches its maximum output capacity. The power supply module with the next highest output voltage will then start sourcing current until it too reaches maximum capacity. This continues until all of the load current demand is met. Thus, some power supply modules in the system will operate at maximum capacity, while others will operate at lighter load. Having some power supplies in current limit and some with very light load causes uneven stressing and aging of the power system, which in turn leads to reliability problems.

Startup of the parallel power supply system is also a problem. The power supply module that starts first will try to supply all of the load current until the other modules reach regulation. This can cause false tripping of overcurrent protection circuits within the power supply modules (not shown). Thus, it is apparent that some method must be used to force equal current sharing between the power supply modules 13, and to control the startup of the power supply modules 13 in a way that all of the modules reach regulation at the same time.

When the load current $i_{LOAD}$ is variable and an expandable parallel power supply system is used, the user needs to know when the load current has increased to the point that the existing number of power supply modules 13 can no longer supply enough current to be N+1 redundant. Thus, it is desirable to have a method of monitoring the load current and the output currents of the individual power supply modules 13 so that the user will know when an additional power supply 13 is needed.

An additional necessary element of a parallel power supply system 11 is fan array 17. The fan array 17 includes at least one but usually multiple individual fans 19. Fans 19 may be incorporated within the individual modules rather than in an array as shown. In any event, fans 19 are necessary to prevent overheating of the power supply modules 13.

The fans 19 are typically the least reliable components in a power supply system. When one or more of the fans 19 in the fan array 17 fail, the entire parallel power supply system 11 fails due to overheating. In conventional systems, fans are replaced at regular maintenance intervals to avoid fan failure. However, this often results in replacing fans that do not in fact require replacement, thus leading to increased maintenance costs. It is desirable to have a method of monitoring fan performance in the parallel power supply system to predict fan failure.

The power supply modules 13 may be of any type, such as a pulse width modulated (PWM) forward converter. An example of a PWM forward converter with feedback control is shown schematically in FIG. 2. In the circuit shown, the input voltage $V_{IN}$ is selectively applied to the primary windings of a transformer 21, under control of a switching device 23. Diode 25 maintains proper direction of current flow through the primary windings. Switching device 23 is controlled by PWM controller 27 to apply pulses of desired duration to the primary windings.

The secondary winding of transformer 21 is connected to an LC circuit comprising inductor 31 and capacitor 33 which, together with diode pair 29, function to smooth the output voltage $V_{OUT}$. A feedback circuit denoted generally as 35 monitors the output voltage $V_{OUT}$ and provides output voltage level indication to PWM controller 27 via optoccupier 37. In this example, feedback circuit 35 includes diode 39, which may be embodied in, e.g., the TL-431 chip available from Texas Instruments. Resistors 41, 43, and 45 are selected to provide proper voltage levels across diode 39.

In operation, PWM controller 27 varies the pulse width applied to the primary windings of transformer 21 via switching device 23 in response to the output voltage level indication provided via optoccupier 37. Longer pulses increase the average energy transferred to the windings of the transformer, and result in an increased output voltage. Shorter pulses decrease the output voltage. Thus, as long as the converter circuit remains in regulation, PWM controller 27 will ensure the output voltage $V_{OUT}$ remains constant.

As explained above, when two or more converter circuits such as the one shown in FIG. 2 are connected in parallel to drive a common load, the individual converters will not share current equally because of small differences in component tolerances. Thus, some converters will work harder than others, and some may overload on startup if the converters do not all reach regulation at the same time.

SUMMARY OF THE INVENTION

In one aspect, the invention relates to a power conversion module that includes an input and an output, a power converter for supplying power from the input to the output, a controller for controlling the amount of power supplied from the input to the output in response to a feedback circuit, a module current sensing circuit for sensing module output current at the output, and a microprocessor for selectively adjusting voltage in the feedback circuit in response to the module output current sensed by said module current sensing circuit.

In another aspect, the invention relates to a parallel power supply system including a plurality of power supply modules. Each power supply module includes an input and an output, a power converter for supplying power from the input to the output, a controller for controlling the amount of power supplied from the input to the output in response to a feedback circuit, a module current sensing circuit for sensing module output current at the output, and a microprocessor for selectively adjusting voltage in the feedback circuit in response to the module output current sensed by the module current sensing circuit. The power supply system also includes a communication link that allows communication between the microprocessors of the plurality of power supply modules.

In another aspect, the invention relates to a method of controlling current sharing between a plurality of power supply modules in a parallel power supply system. Each power supply module has a microprocessor. The method includes: a) determining average module output current; b) communicating the average module output current to the power supply modules; c) comparing the average module output current to module output current of each power supply module; and d) adjusting the module output current of each power supply modules toward the average module output current if the module output current is not within a predetermined range from the average module output current.

In another aspect, the invention relates to a method of checking fan status in a power supply module having a fan and a microprocessor, the microprocessor being arranged to control fan speed by controlling voltage applied to the fan and being arranged to monitor fan speed via a tachometer output. The method includes applying maximum voltage to the fan to obtain maximum fan speed, measuring a first fan speed via the tachometer output, waiting for a request to check fan status, upon a receipt of a request to check fan status, applying maximum voltage to the fan to obtain maximum speed, measuring a second fan speed via the tachometer output, and comparing the first fan speed with the second fan speed to determine fan status.

BRIEF DESCRIPTION OF THE DRAWINGS

FIG. 10 is a diagram showing data acquisition for a microprocessor-controlled power supply module in accordance with an embodiment of the invention.

DESCRIPTION OF THE PREFERRED EMBODIMENTS

Embodiments of the invention will be described in detail below with reference to the accompanying figures.

Figure 1:
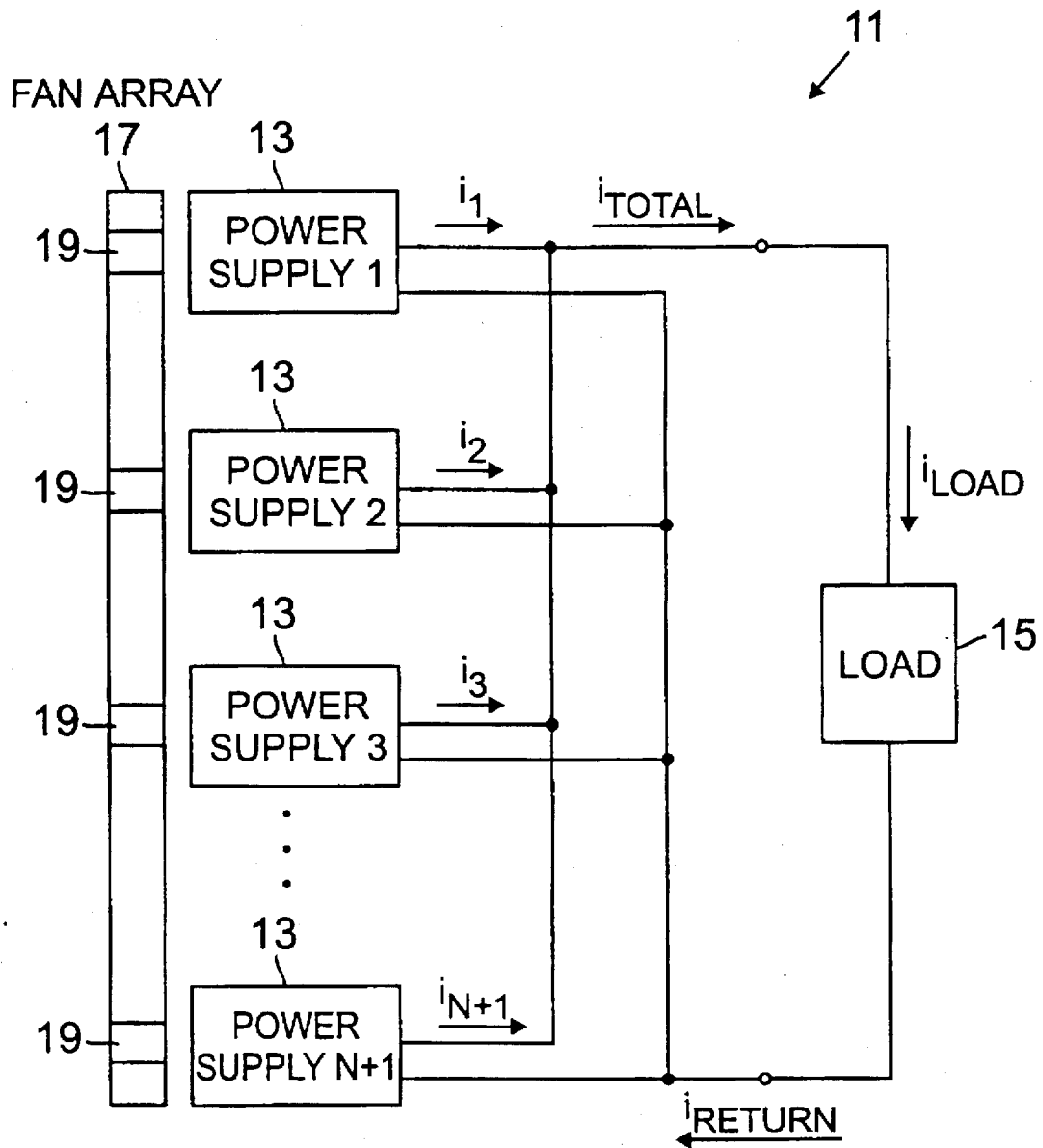
FIG. 1 is a diagram showing a conventional parallel power supply system.
Figure 2:
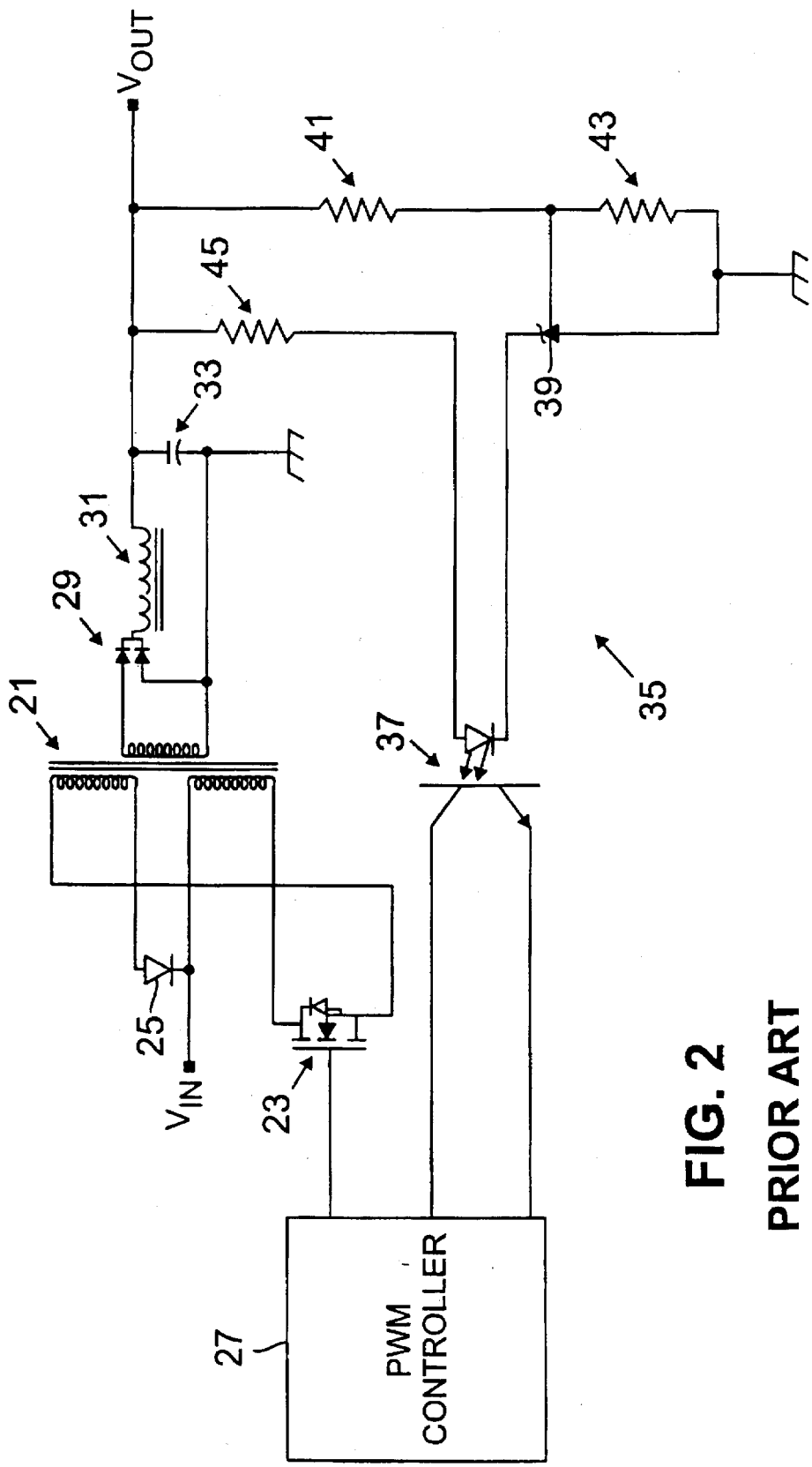
FIG. 2 is a diagram showing a conventional PWM forward converter.
Figure 3:
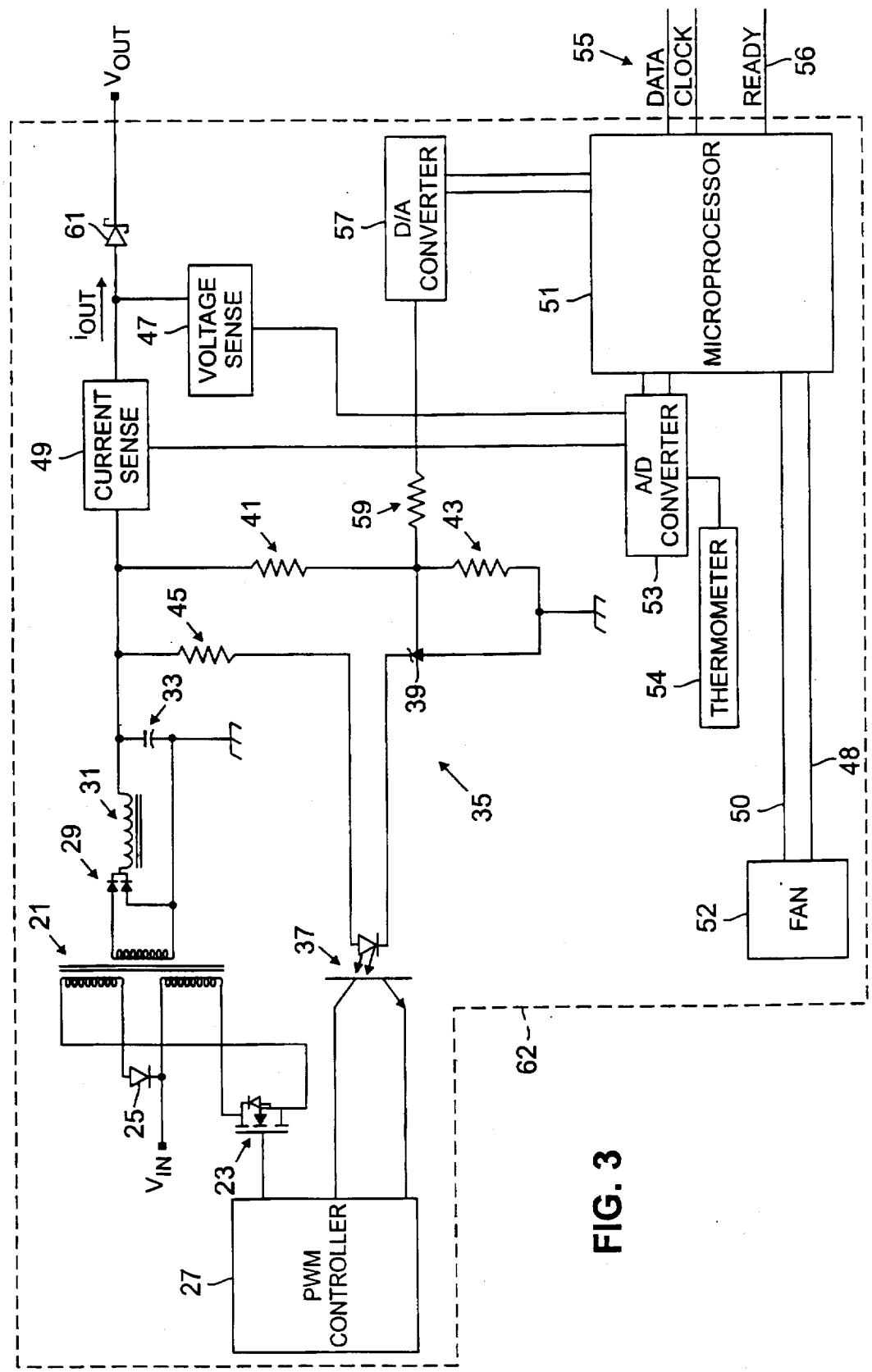
FIG. 3 is a diagram showing a PWM forward converter with microprocessor control in accordance with an embodiment of the invention.

FIG. 3 shows a power supply module 62 comprising a PWM forward converter with microprocessor control in accordance with one embodiment of the invention. The PWM converter itself is identical to that shown in FIG. 2, and the same numbering is used for like elements. The output voltage and current are detected by voltage sense circuit 47 and current sense circuit 49, respectively. The outputs of the current and voltage sense circuits are applied to a microprocessor 51 via an A/D converter 53. Microprocessor 51 communicates with the microprocessors of other converter modules (not shown) via a serial communications link 55 comprising a data line and a clock line, e.g., an I²C communications link. A ready line 56 is provided that is asserted after microprocessor 51 finishes a power on self test and the power supply module 62 is ready to turn on.

If microprocessor 51 determines the output voltage $V_{OUT}$ or output current $i_{OUT}$ is out of range, microprocessor 51 applies a bias voltage to feedback circuit 35 so as to shift the reference voltage received by PWM controller 27. The bias voltage is applied from the microprocessor 51 via a D/A converter 57 and resistor 59. In this way, the microprocessor is able to both monitor and control the output of the PWM forward converter.

An "oring" diode 61 is provided at the output of the converter to prevent the failure of one converter from crashing the entire parallel power supply system. A fan 52 is provided within the module 62 to prevent overheating. Microprocessor 51 controls the voltage applied to fan 52 (and hence its speed) via line 48. Microprocessor 51 also selectively monitors the actual speed of fan 52 via fan tachometer output line 50. Microprocessor 51 determines the appropriate speed for fan 52 based upon temperature readings received from thermometer 54 via A/D converter 53.

Figure 4:
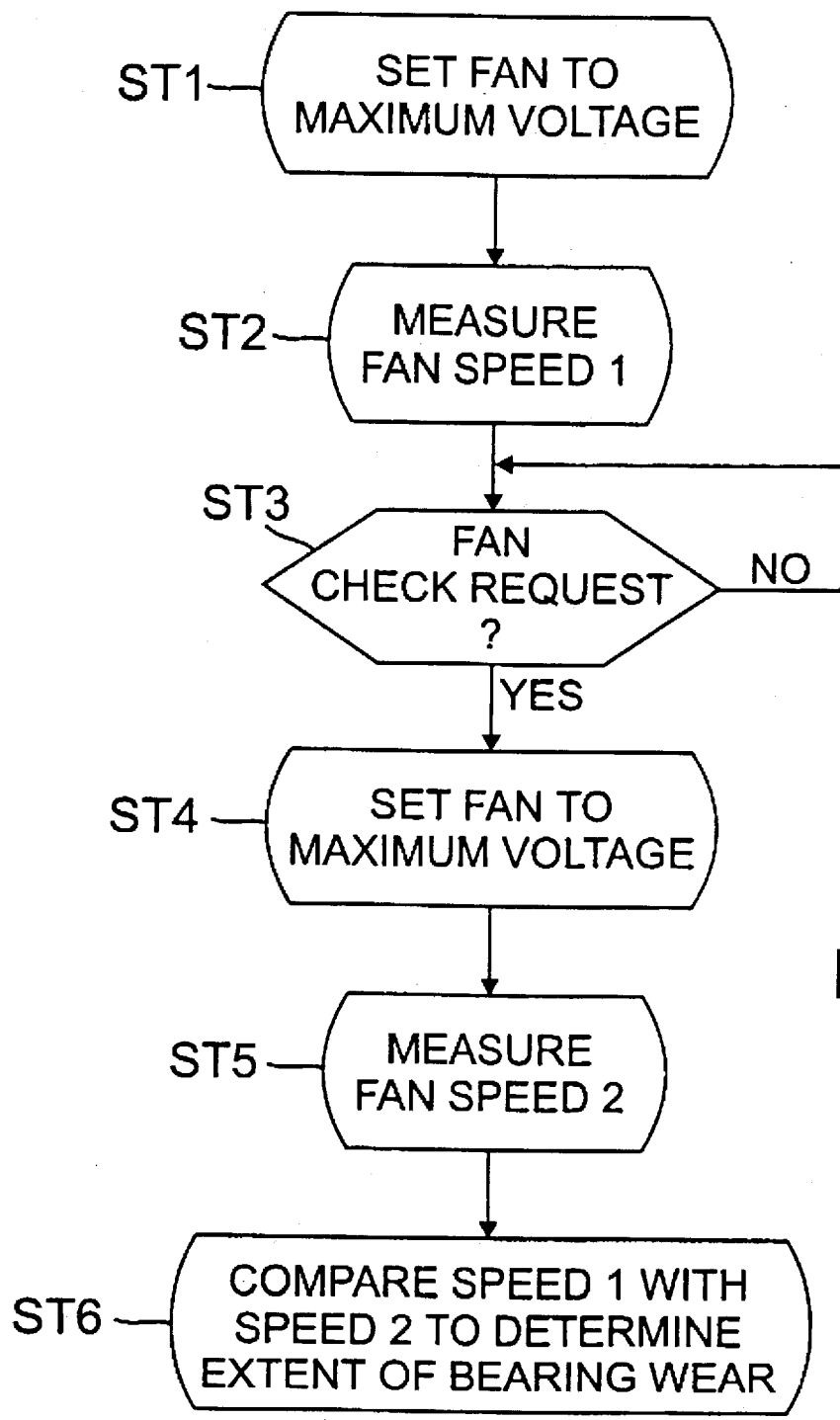
FIG. 4 is a flow diagram showing a fan check routine in accordance with an embodiment of the invention.

One significant feature of the invention is the ability of microprocessor 51 within the module 62 to monitor performance of fan 52 and predict possible fan failure. A flow diagram for this routine is shown in FIG. 4. In step ST1, microprocessor 51 sets line 48 to maximum voltage to produce maximum fan speed. The fan speed is then measured in step ST2 via line 50 (fan speed 1). In Step ST3 the microprocessor waits for a fan status check request. This request may be generated internally within the microprocessor in response to certain events and/or after expiration of a certain amount of time, or may be received externally from a host computer or another module via communication link 55. In any event, when a fan check request is received, microprocessor 51 again sets line 48 to maximum voltage (step ST4), and measures fan speed in ST5 (fan speed 2). In step ST6, fan speed 1 is compared with fan speed 2 to determine the extent of fan bearing wear. The decrease in actual measured fan speed at the same applied voltage is an excellent indication of the extent of wear of the fan bearings, and thus regular performance of the routine of FIG. 4 allows the microprocessor 51 to alert the user or host computer when bearing wear has reached the point that fan 52 should be replaced. At the same time, if significant wear is not detected by the routine of FIG. 4, unnecessary replacement of the fan can be avoided.

Figure 5:
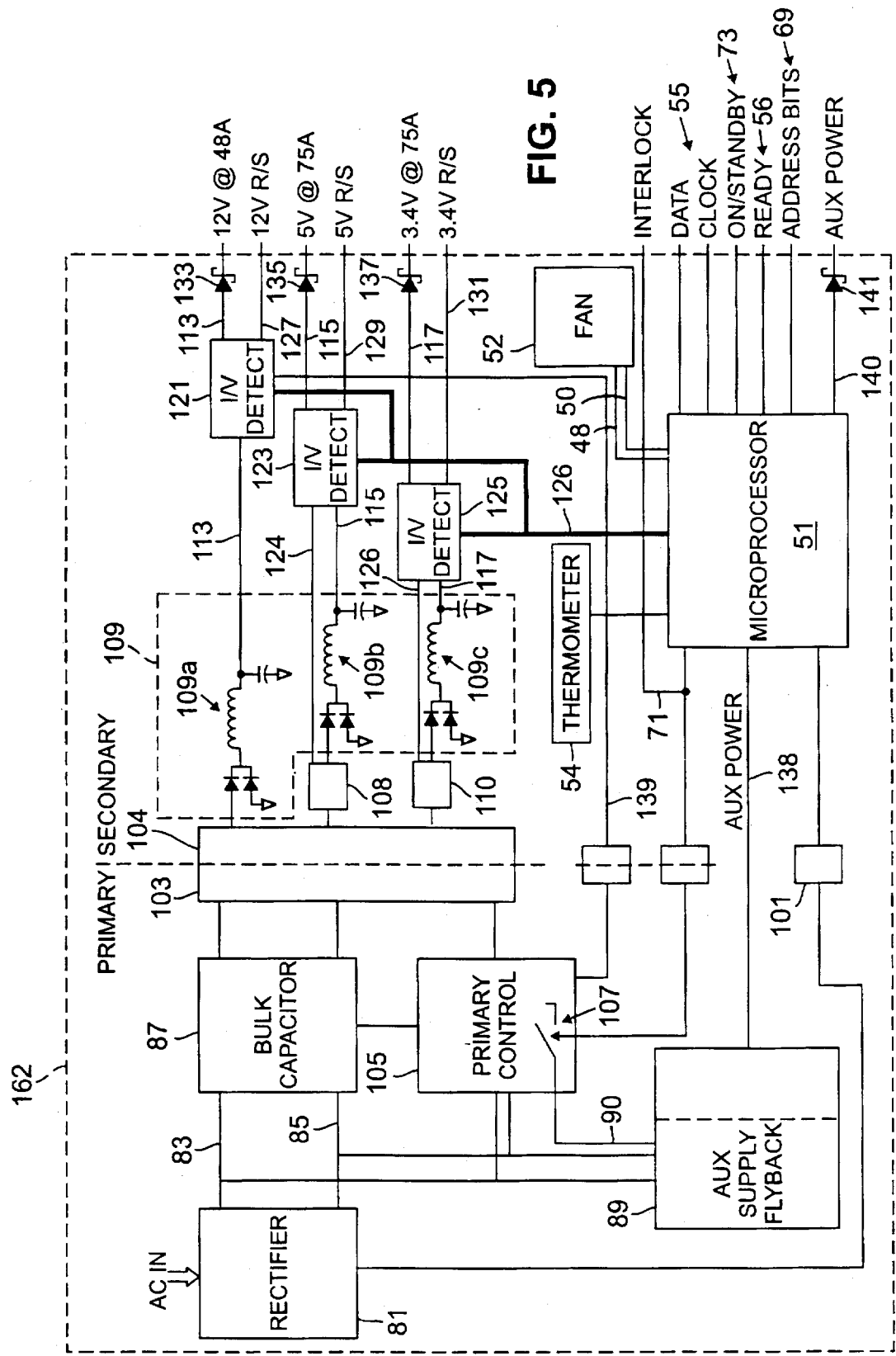
FIG. 5 is a diagram showing a multi-output PWM forward converter with microprocessor control in accordance with an embodiment of the invention.

FIG. 5 shows a microprocessor-controlled multi-output power supply module 162 in accordance with an embodiment of the invention. Like elements from the single-output module of FIG. 3 are denoted with the same reference numbers. AC voltage, typically in the range of 90–265 V, is applied to a rectifier 81. Rectifier 81 produces positive rectified voltage on line 83 and negative rectified voltage on line 85, both of which are applied to a bulk capacitor 87. The rectified voltage from rectifier 81 is smoothed by bulk capacitor 87 and is selectively applied to transformer 103 under control of primary control 105. Primary control 105 includes a cutout switch 107 that can be opened to disable the module by activation of interlock line 71, either by microprocessor 51 or by an external source.

The voltage applied to the primary side of transformer 103 impresses a voltage on the secondary side 104 of the transformer, which is in turn applied to converter stages 109. In this implementation, three independent converter stages 109a–109c are provided. Construction of the converter stages and choice of the component values is well known, and thus will not be described in detail here. It will be apparent that any type of converter and converter stage could be used in connection with the microprocessor control of this invention.

Converter stage 109a produces a 12 V, 48A output on line 113 that is applied to I/V detection circuit 121. Circuit 121 detects the voltage and current on line 131, and passes this information to microprocessor 51 via bus 126. Circuit 121 passes the voltage on line 113 to the output via oring diode 133, and also produces a 12 V R/S output on line 127. Circuit 121 also generates a primary feedback control signal, which is applied to primary control 105 via line 139.

Converter stage 109b produces a 5 V, 75A output on line 115, that is applied to I/V detection circuit 123. Circuit 123 outputs the voltage on line 115 via oring diode 135. Circuit 123 also produces a 5 V R/S output on line 129. Similarly, output stage 109c produces a 3.4 V, 75A output on line 117, that is applied to I/V detection circuit 125. This voltage is output via line 117 and oring diode 137. Circuit 125 additionally produces a 3.4 V R/S output on line 131. As with circuit 121, circuits 123 and 125 communicate the detected currents and voltages from the converter stages to microprocessor 51 via bus 126.

In general, each output requires independent regulation control so that microprocessor 51 can maintain each of the outputs at the correct level. However, in this implementation, only circuit 121 generates a feedback control signal that is applied to primary control 105. With respect to converter stages 109b and 109c, each is provided with a post regulator 108, 110, respectively, that regulates its output in response to a control signal 124, 126, generated by circuits 123 and 125. Post regulators 108 and 110 may be of any known type, including for example mag-amps or linear regulators.

As with the embodiment shown in FIG. 3, microprocessor 51 communicates with other modules and/or a host computer via serial communication link 55. On/standby signal 73 allows the module to be placed in on or standby modes. As noted above, interlock signal 71 selectively disables the converter, and ready line 56 indicates when the power supply module is ready to turn on. Address bit lines 69 provide the module with a unique address described in more detail below.

Microprocessor 51 controls the speed of fan 52 via speed control line 48, and selectively monitors the speed via line 50. Microprocessor 51 also selectively reads temperature from thermometer 54.

Auxiliary power from auxiliary supply flyback 89 is provided to microprocessor 51 via line 138 and is output by the microprocessor on line 140 via oring diode 141. Auxiliary supply 89 receives power from the outputs of rectifier 81, which are also applied to primary control 105. Auxiliary supply 89 provides supply voltage to primary control 105 via line 90, applied to cut-out switch 107 controlled by interlock signal 71 as explained above. Having the auxiliary supply 89 supply power to the microprocessor and other control circuits allows the interlock and on/standby signals to be secondary referenced for safety reasons. Having the control circuits biased up also helps all power supplies to reach regulation at the same time. Keeping the microprocessor auxiliary output 140 powered up at all times also permits remote on/off control of the system via modem from the host system.

A hit counter 101 is provided to monitor the input AC voltage to rectifier 81 and record any voltage spikes that exceed a certain threshold (e.g., 500 V). Hit counter 101 is accessible by microprocessor 51 for diagnostic purposes in the event an error occurs in the host system.

Figure 6:
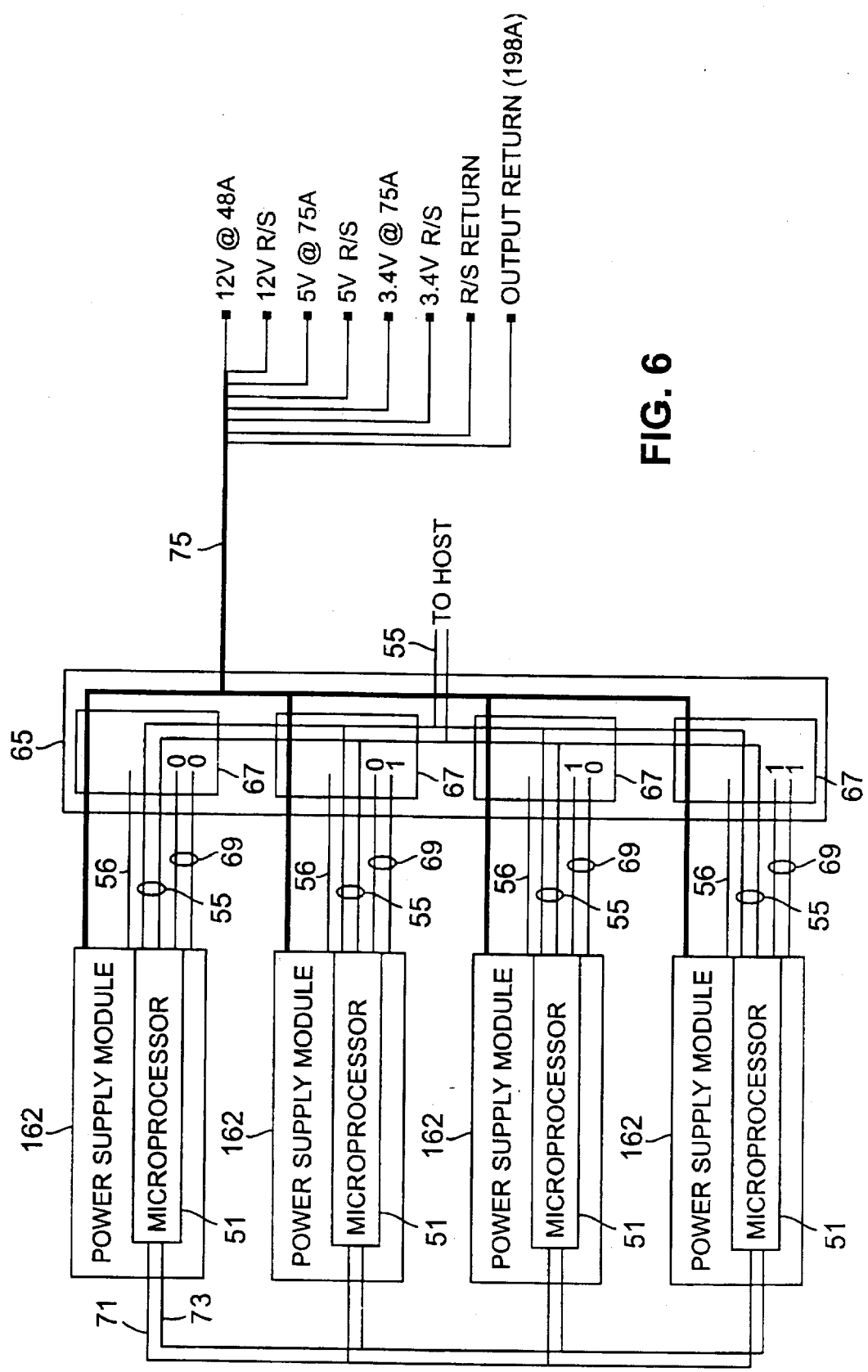
FIG. 6 is a diagram showing a four-module multi-output parallel power supply system with microprocessor control in accordance with an embodiment of the invention.

FIG. 6 shows a four-module multi-output parallel power supply system in accordance with an embodiment of the invention. In this implementation, four power supply modules 162 are shown, although it will be understood that any number of power supply modules may be used in the parallel power supply system.

Each of the four power supplies 162 includes the circuitry shown in FIG. 5, including microprocessor 51. The power supply modules 162 are plugged into a backplane printed circuit board (PCB) 65 having four connectors 67. The connectors 67 allow communication between the microprocessors 51 of each power supply module 162 via serial communication link 55. An output of serial communication link 55 is also provided to allow connection to a host computer (not shown). The connectors 67 also connect the ready lines 56 of each supply 162 together.

In this four module implementation, a two-bit address connection 69 is provided between each microprocessor 51 and its corresponding connector 67, thus providing four unique addresses for the four power supply modules. The four microprocessors 51 are also connected via interlock line 71 and ON/STANDBY line 73. Each power supply module 162 is additionally provided with input voltage and ground connections which, for the sake of simplicity, are not shown in this figure.

The power supply modules 162 drive supply bus 75 in parallel. Consistent with FIG. 5, each power supply module 162 provides three output voltages. Thus, bus 75 carries six output lines which, in this embodiment, are for the following outputs: 12 V@48A; 12 V R/S; 5 V@75A; 5 V R/S; 3.4 V@75A; and 3.4 V R/S. In addition, bus 75 carries two return lines, the R/S return and the output return (198).

When the modules are installed in the end system, the two address pins in each connector 67 of the back plane 65 are used to determine how many supply modules are installed. Each slot has a different high/low combination on the two pins for a total of four unique addresses. It will be understood that this could be expanded to N modules by using additional pins.

Figure 7:
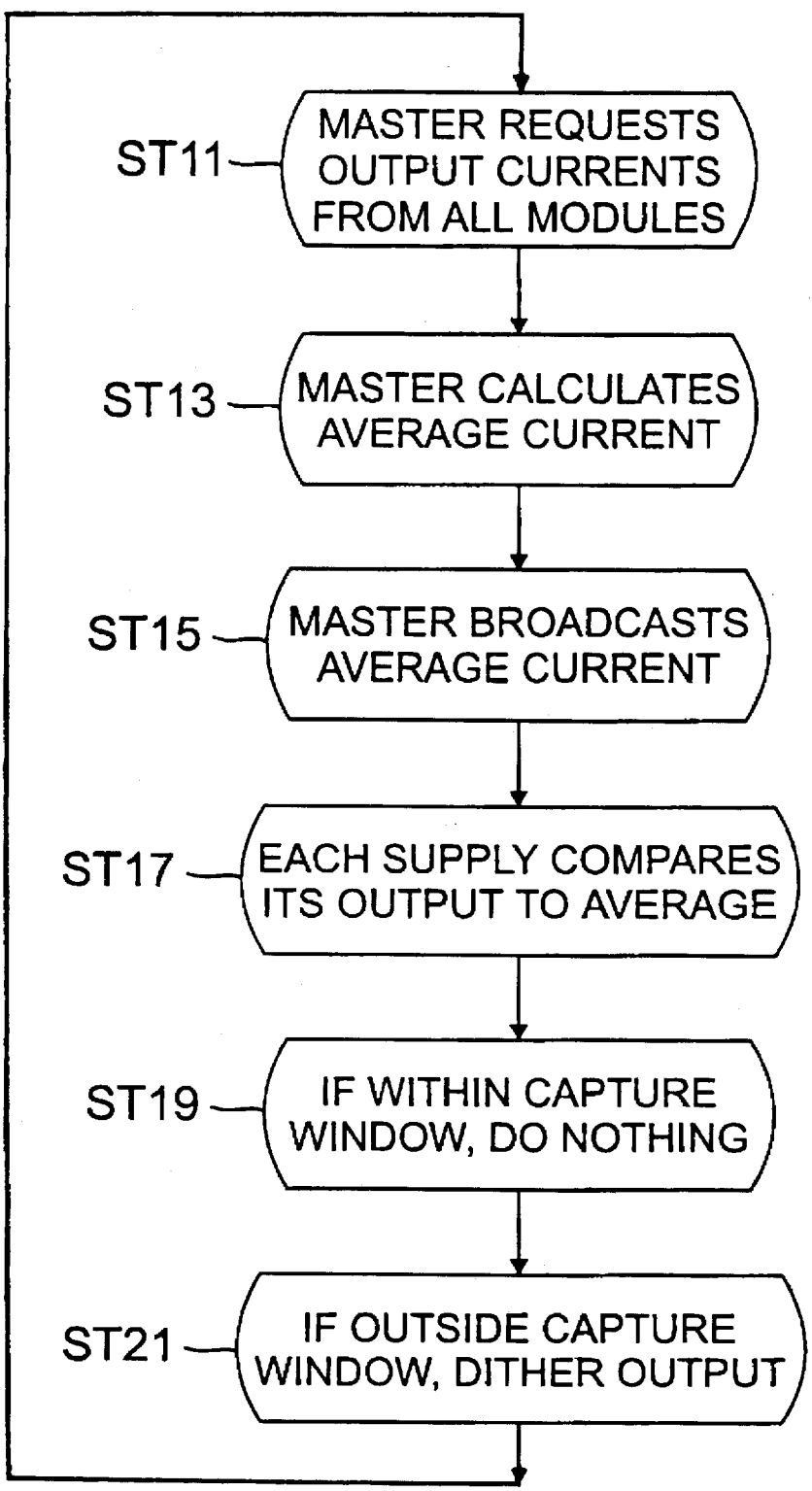
FIG. 7 is a flow diagram showing a current sharing control routine in accordance with an embodiment of the invention.

The current-sharing routine carried out by the microprocessor 51 of the master module is illustrated in FIG. 7. In step ST11, the master requests the output current from each module via serial communication link 55. The master then calculates the average module output current (ST13). Alternatively, the master module may determine the average module output current by monitoring the system output current and dividing by the number of modules. The master broadcasts the average output current (ST15) and each module compares its output to the average (ST17). If the module's output current is within a "capture window", i.e., is within a predetermined range centered around the average output current, the module does nothing (ST19). If the module's output is outside the capture window, the module adjusts its output voltage by writing a value to its D/A converter 57 that shifts (dithers) its reference voltage and makes its output closer to the average output (ST21). The routine is then repeated after a predetermined delay. As a result of this routine, each module in the parallel power supply system is forced to produce a proportionate share of the output current, and thus the difficulties encountered in the prior art with some modules operating in current limit and others under a very light load is avoided.

Each microprocessor in the modules 162 checks its module's output voltage to make sure the dither command does not cause the module to go out of regulation. This sequence is repeated after a time delay on the order of seconds. By slowly dithering the output voltage and hence the output current of each module, the average current supplied by each module becomes balanced. Because the current share dithering sequence takes place over a period of seconds or minutes, each module's feedback loop operates in a normal fashion and reacts to any transient load changes just a non-paralleled power supply would.

The microprocessors 51 are redundant, and thus the failure of the master module would not bring down the system as would be the case in a standard master/slave control scheme. Any microprocessor can become the master module. The determination of which microprocessor is master occurs at the beginning of the current share dither sequence.

Figure 8:
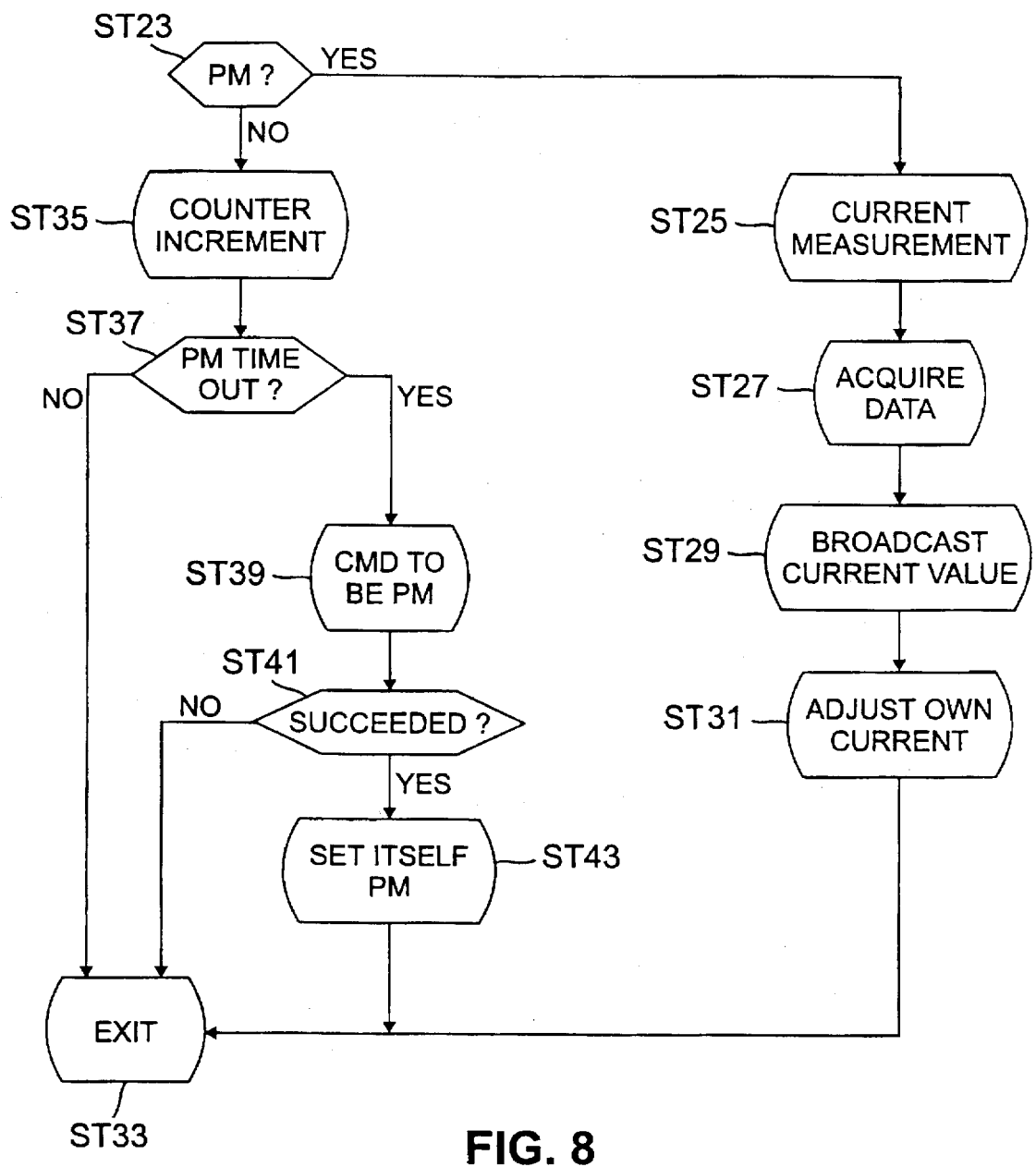
FIG. 8 is a flow diagram showing a master establishment routine in accordance with an embodiment of the invention.

FIG. 8 is a flow diagram showing the master determination sequence. This routine is performed by each microprocessor in each of the modules present in the parallel power supply system. In step ST23, it is determined whether the microprocessor performing this routine has already been designated as master ("PM"). If so, the microprocessor proceeds to initiate current measurement (ST25) and acquire the data (ST27). The current value is then broadcast via serial communication link 55 (ST29), and the microprocessor adjusts its own current as necessary (ST31). The routine then terminates (ST33). If the answer to the decision in step ST23 is no, a counter is incremented (ST35) and the routine stalled (ST37) while the microprocessor waits to see if any other microprocessor asserts itself as master. If another microprocessor asserts itself as master before the counter is timed out, the answer to the time out decision in step ST37 is no, and the routine terminates. If the timer times out, the microprocessor issues a command over serial communication link 55 establishing itself as master (ST39). The microprocessor then determines whether the attempt to establish itself as master succeeded (ST41). If not, the routine terminates. If the command was successful, the microprocessor establishes itself as master (ST43) and the routine terminates.

The current sharing feature of the invention also allows coordinated startup of the modules in the parallel power supply system. This eliminates startup sequencing problems typical in prior art systems, where some modules will turn on first and run in current limit until the other modules have reached regulation. Synchronized startup is achieved using the ready line 56. The ready line 56 is pulled up to the auxiliary supply 89, and each microprocessor 51 can pull it down with an open collector driver (not shown). The ready line connects all of the power supply modules together. Each of the microprocessors 51 must release the ready line before it can go high. After AC power is applied to a power supply module, the microprocessor resets, performs a self test, and loads calibration constants. During this time, the power supply module is not ready to be turned on, so the microprocessor holds the ready line low. After the initialization routines are complete, the microprocessor waits until the on/standby line 73 is activated by a user or by the host computer. When any microprocessor sees on/standby go low (i.e., activated), it releases its ready line. When the last microprocessor releases the ready line, all power supply modules will start. This coordinates the startup of all supply modules.

In the event of a failed power supply module, where if one of the power supply modules is not ready, the ready line will not go high. To overcome this situation, a timer is started when on/standby is asserted. As explained in more detail below with reference to FIG. 9, after the timer times out, the master supply issues a startup command over the serial communication link 55. This command is in the form of a "ALLCALL" start command to which all microprocessors must respond. When the ALLCALL start command is received, all power supply modules will start at once.

The microprocessor control of the invention also allows modules to be "hot plugged", i.e., plugged into the parallel system while the system is in operation without interrupting the output supply or sending any of the modules out of regulation.

Figure 9:
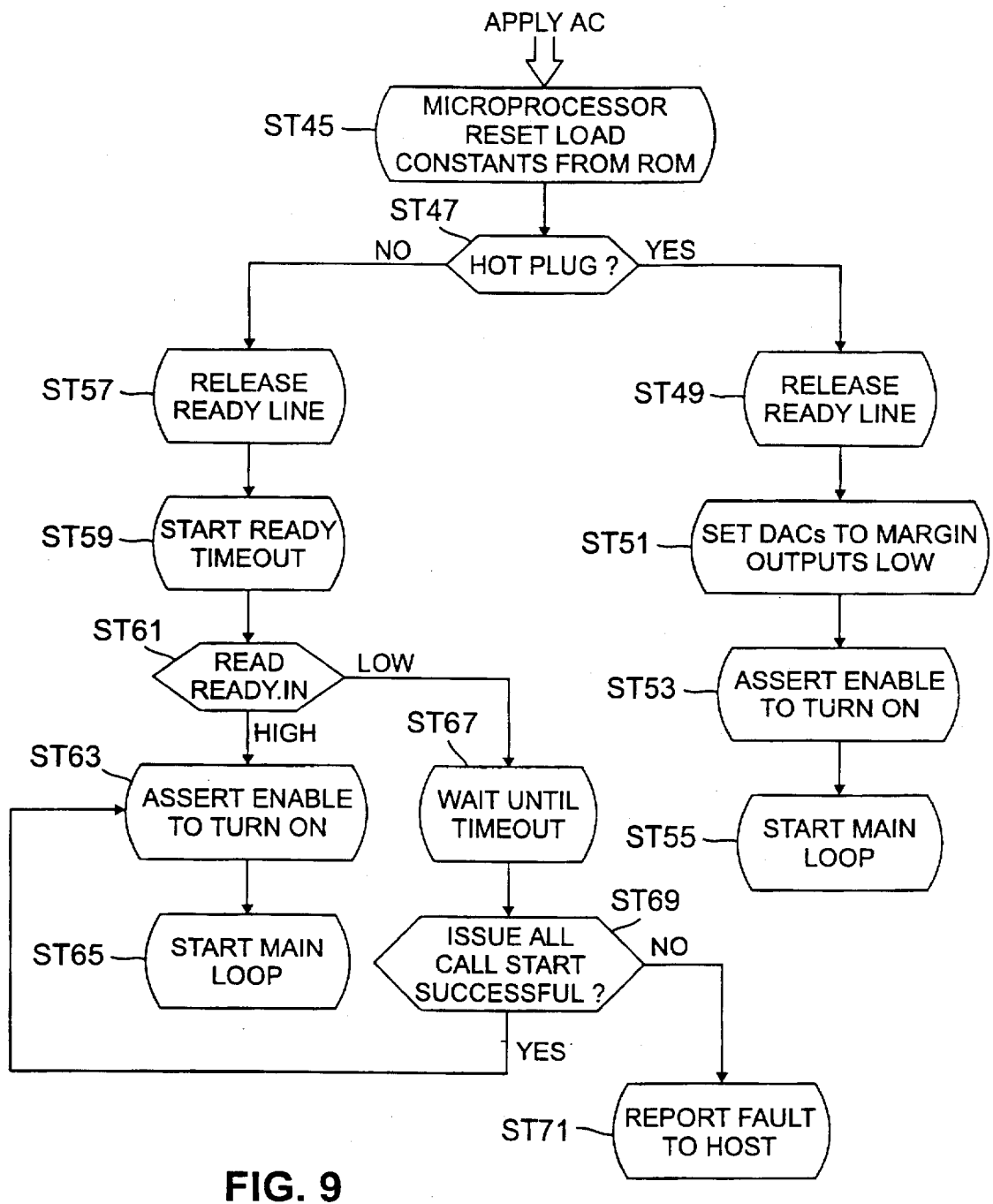
FIG. 9 is a flow diagram showing a startup routine in accordance with an embodiment of the invention.

The startup sequence carried out by the microprocessor 51 of each module is illustrated in FIG. 9. In step ST45, in response to the application of AC voltage to the circuit, the microprocessor resets and loads calibration constants from an internal read only memory (ROM) (not shown). The microprocessor 51 then reads the outputs of the parallel power supply system to determine whether this is hot plug startup (ST47). If the startup is not hot plug, the ready line is released (ST57) and ready time out is initiated (ST59). READY.IN is read (ST61) and if it is high Enable is asserted to turn the outputs on (ST63). The main loop (i.e., the routine shown in FIG. 8) is then started (ST65). If READY.IN in ST61 is low, the sequence waits until ready has timed out (ST67) and then issues an ALLCALL start command (ST69). If this command is successful, the routine proceeds to step ST63, where the main outputs are turned on. If the command is not successful, a ready fault is reported to the host (ST71).

If the startup is hot plug, the ready line 56 is released (ST49) and the digital-to-analog converter within the module is set to margin the outputs low (ST51). Enable is then asserted to turn the converter on (ST53), and the microprocessor begins the main loop (the routine of FIG. 8) in step ST55. Once the main loop has started, the current share feature of the invention walks the outputs of the hot plugged module into regulation.

Microprocessor control of the individual power supply modules in accordance with the invention allows active control of current sharing between the modules as well as a high degree of redundancy in the event of a failure. Additional advantages obtained through the use of the microprocessors include active monitoring of load requirements.

With a microprocessor in each module reading output current and voltage for each module, this information can be requested by the host computer via serial communication link 55. This information can then be used, e.g., to determine if the load has increased to the point that an additional module needs to be added to maintain N+1 redundancy. The host computer can also sense and report when a module has failed and when service is needed.

Another advantage is that during factory testing, the output of each module can be trimmed by storing a D/A converter calibration offset factor that trims out any tolerance error. This eliminates the need for trim potentiometers that may be unreliable. The microprocessors can also be used to provide the function of output voltage margining. In response to a command from the host computer, the microprocessor within each module can be used to set the outputs of each supply up or down by, for example, five percent for reliability testing of system components.

Another important aspect of microprocessor control in accordance with the invention relates to the fact that the microprocessor within each module has control of fan speed. As noted with respect to FIGS. 3 and 4, the tachometer output 50 of the fan 52 within each module is monitored by the microprocessor. This output may then be used by the microprocessor as shown in FIG. 4 to predict impending fan failure. Thus, a service reminder can be sent to the user when a fan is slowing down and may be in need of replacement. This both ensures that fans are replaced before they fail and also obviates the necessity of replacing fans at regular intervals that may not in fact be in need of replacement.

Use of the microprocessors in the individual modules achieves the advantages noted above, yet does not impede operation of the individual converters. All of the modules perform as if they were independent under normal operating conditions and can be optimized for regulation and response. In addition, the serial communications link 55 is inherently noise immune, a significant advantage over analog control schemes.

FIG. 10 is a detailed diagram of the data acquisition circuitry for microprocessor 51 in a multi-output module such as that shown in FIG. 5. Microprocessor 51 may be, for example, the 87C551 chip available from Philips. The Philips chip has internal A/D converters 161, but the number of inputs is not sufficient for the data acquisition needs of this implementation of the invention. Accordingly, a multiplexor (MUX) 163 is employed to increase the effective number of A/D converter inputs to microprocessor 51. The analog inputs to MUX 163 include the input from thermometer 54, the input from AC input voltage line 165, and a number of inputs 167 that monitor the outputs on the output bus of the parallel power supply system. The output of MUX 163 is then applied via line 168 to one of the eight direct A/D inputs to microprocessor 51.

Three of the remaining A/D converter inputs are used for three current sense circuits corresponding to the three outputs of the module of this embodiment: I sense 1 (169); I sense 2 (171); and I sense 3 (173). Three other direct A/D inputs are employed for the three voltage monitor lines corresponding to the outputs of the module ($V_{OUT1}$–$V_{OUT3}$).

Microprocessor 51 processes the data acquired from these sources and uses this information as explained above to selectively generate bias voltages 181 to dither the voltage feedback loops of the output channels of the module. The analog output voltages 181 are generated by D/A converters 177, which are controlled by microprocessor 51 via digital I/O bus 183. Digital I/O bus 183 also allows the microprocessor 51 to communicate with and control fan speed control 179 and MUX 163. As in the prior embodiments, serial communication link 55 is provided for communication between microprocessor 51 and corresponding microprocessors in parallel modules.

Various embodiments of the invention have been described above with reference to the figures. However, it will be understood that the invention is not limited to these embodiments, but rather is limited only by the scope of the appended claims.

What is claimed is:

1. A parallel power supply system, comprising:
   a plurality of power supply modules, each comprising:
     an input and an output,
     a power converter for supplying power from the input to the output,
     a controller for controlling the amount of power supplied from the input to the output in response to a feedback circuit,
     a module current sensing circuit for sensing module output current at the output, and
     a microprocessor for selectively adjusting voltage in said feedback circuit in response to the module output current sensed by said module current sensing circuit; and
   a communication link allowing communication between the microprocessors of said plurality of power supply modules.

2. The system of claim 1, wherein each of said plurality of power supply modules further comprises a voltage sensing circuit for sensing module output voltage, and wherein said microprocessor adjusts the voltage in said feedback circuit in response to the voltage sensed by the module output voltage sensing circuit.

3. The system of claim 1, wherein said power converter of at least one of said power supply modules is a PWM forward converter.

4. The system of claim 1, wherein one of said power supply modules further comprises a fan, and wherein said microprocessor controls speed of said fan and selectively monitors the speed of said fan.

5. The system of claim 4, further comprising a thermometer, wherein said microprocessor controls the speed of said fan in response to temperature detected by said thermometer.

6. The system of claim 1, further comprising a backplane having a socket for each of said power supply modules, said sockets having address pins establishing a unique address for each of said power supply modules.

7. The system of claim 6, wherein the microprocessor of one of said plurality of power supply modules is chosen to be master based upon communication between the microprocessors of said power supply modules via said communication link.

8. The system of claim 1, wherein each of said plurality of power supply modules comprises a fan, wherein the microprocessor of each power supply module controls speed of the fan in each power supply module and selectively monitors the speed of the fan.

9. The system of claim 8, wherein each of the power supply modules further comprises a thermometer, wherein the microprocessor of each power supply module controls the speed of the fan in each power supply module in response to temperature detected by said thermometer.

10. The system of claim 1, further comprising
    a system output bus connected to add the module output currents of said power supply modules; and a system current sensing circuit for sensing system output current on said system output bus;

wherein a microprocessor on one of said power supply modules monitors said system output current and adjusts the module output current in response thereto.

11. The system of claim 10, wherein said microprocessor on said one power conversion module determines average module current from said system output current and instructs all power supply modules to adjust their respective module output currents toward the average module output current.

12. The system of claim 1, wherein a microprocessor on one of said power conversion modules determines average module current from the module output currents of all of said power supply modules and instructs all power supply modules to adjust their respective module output currents toward the average module output current.

13. A method of controlling current sharing between a plurality of power supply modules in a parallel power supply system, each said power supply module having a microprocessor, comprising:

a) determining average module output current;

b) communicating said average module output current to said power supply modules;

c) comparing said average module output current to module output current of each power supply module; and d) adjusting the module output current of each power supply module toward said average module output current if said module output current is not within a predetermined range from said average module output current.

14. The method of claim 13, further comprising waiting a predetermined period of time, and subsequently repeating steps a) through d).

15. The method of claim 13, wherein said step of determining average module output current comprises requesting module output current readings from the microprocessors of each of said plurality of power supply modules.

16. The method of claim 13, wherein said step of determining average module output current comprises determining output current of the parallel power supply system and dividing by the number of power supply modules.

17. The method of claim 13, further comprising designating a microprocessor in one of said plurality of power supply modules to be a master, and using said master to perform steps a) through d).

18. A method of checking fan status in a power supply module having a fan and a microprocessor, the microprocessor being arranged to control fan speed by controlling voltage applied to the fan, and further being arranged to monitor fan speed via a tachometer output, comprising:

applying maximum voltage to the fan to obtain maximum fan speed;

measuring a first fan speed via the tachometer output;

waiting for a request to check fan status;

upon a receipt of a request to check fan status, applying maximum voltage to the fan to obtain maximum fan speed;

measuring a second fan speed via said tachometer output; and comparing said first fan speed with said second fan speed to determine fan status.

19. The method of claim 18, wherein said comparing comprises determining an extent of fan bearing wear by determining a degree of decrease of said second fan speed with respect to said first fan.

* * * * *